R. D. ALLEY.
COMBINED COTTON SEED PLANTER AND GUANO DISTRIBUTER.

No. 183,788. Patented Oct. 31, 1876.

Witnesses:
C. Clarence Poole
A. S. Youngs

Inventor:
Richard D. Alley
By J. B. Woodruff Attorney

UNITED STATES PATENT OFFICE.

RICHARD D. ALLEY, OF WILSON, NORTH CAROLINA, ASSIGNOR OF ONE-HALF HIS RIGHT TO THOMAS D. GAY, OF SAME PLACE.

IMPROVEMENT IN COMBINED COTTON-SEED PLANTER AND GUANO-DISTRIBUTER.

Specification forming part of Letters Patent No. 183,788, dated October 31, 1876; application filed June 19, 1876.

To all whom it may concern:

Be it known that I, RICHARD D. ALLEY, of Wilson, in the county of Wilson and State of North Carolina, have invented a certain new and useful Improvement in a Combined Cotton-Seed Planter and Guano-Distributer; and the following is a full, clear, and exact description of the same, reference being had to the accompanying drawings, making a part of this specification, in which—

Figure 1:
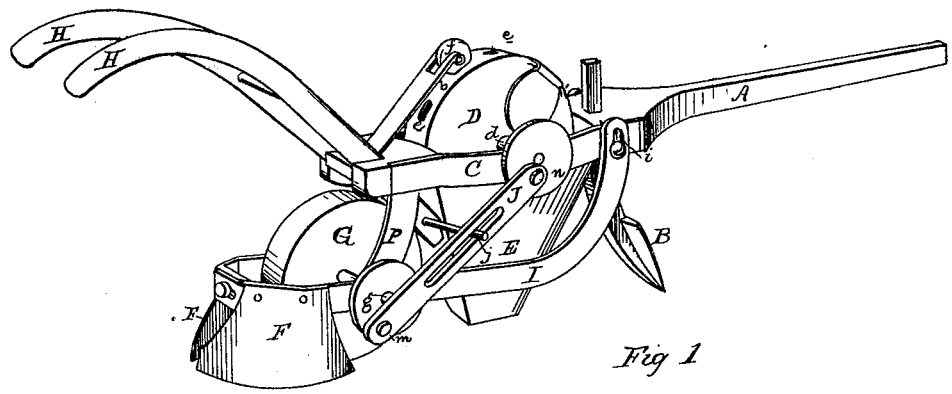
Figure 2:
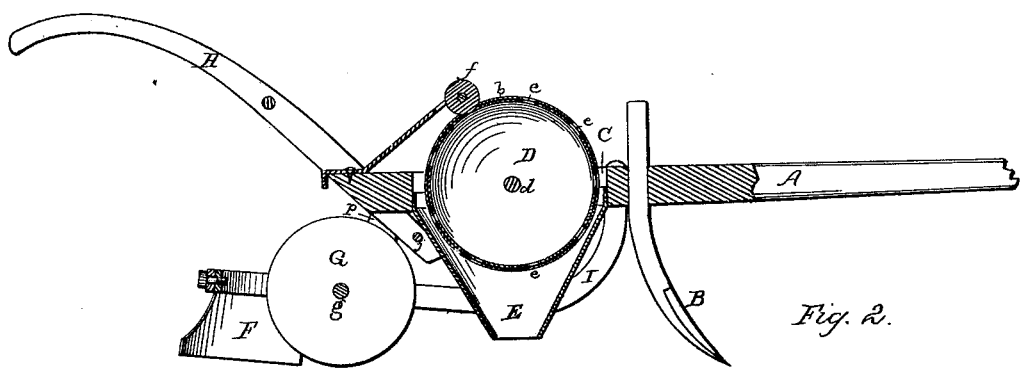
Figure 3:
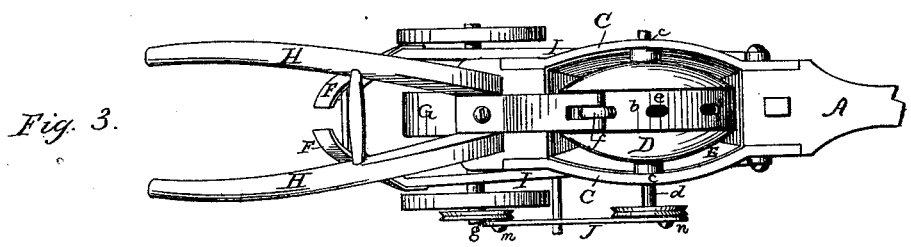

Figure 1 represents a perspective view of my improved agricultural implement, showing the plow-point for opening the soil, the revolving hopper for containing the seed, and also distributing it, as well as the guano or fertilizer, the covering-scrapers and roller, and the coupling bar or link for revolving the hopper. Fig. 2 shows a longitudinal vertical section through the same. Fig. 3 is a plan or top view of the implement, showing the application of the two wheels, instead of one, for sowing cotton-seed, &c.

My invention consists in the arrangement and combination of the several parts of the implement, hereinafter more fully described.

To the plow-beam A, to which the plow B is secured in the ordinary manner, is attached the metal frame C in the rear, which is composed of two side pieces, of such a form as to leave a sufficient space between them to receive the rotary hopper D, the same being hung on a shaft, $d$, passing through its center, having its journal-boxes $c$ $c$ on the upper edges of the frame C. The hopper D is made of sheet metal, of any required dimensions, the two ends being made conical to give a larger space inside, the central portion of the periphery being in a line with the shaft $d$, and is perforated with a series of oblong openings, $e$ $e$, through which the cotton-seed and the fertilizers are distributed as it revolves, emptying its contents into the funnel E, which is secured to the frame C underneath the revolving hopper D, and extends down to near the surface of the soil. Around the plane surface of the hopper D is placed a sliding band or cover, $b$, which can be adjusted over the openings $e$ $e$, in such a manner as to entirely close them, and can be so regulated as to discharge any given quantity of cotton-seed or guano, as may be required.

To prevent the openings $e$ $e$ in the rotating hopper D from getting clogged up with the seed or the fertilizer, I provide a spring-roller, $f$, to ride over the oblong openings $e$ $e$, to force what sticks in them back into the hopper, and thus keeping the openings clean and free to discharge the contents uniformly.

The device for covering the cotton-seed or the fertilizers consists of two adjustable mold-boards or metal scrapers, F F, secured to the rear ends of bent bars I I, which are provided with slots $i$ $i$ in their forward ends, and are secured by thumb-screws to the sides of the frame C, by which the mold-boards or scrapers on their rear ends are raised or lowered, the ends of the shaft $g$ of the roller G forming the bearings on which they rest to operate. The rear ends of the bars I I are also secured together by thumb-screws, so as to adjust the width of the scrapers, they likewise being adjustable up or down by slots and thumb-screws to any desired depth, but not to cut so deep as the plow in front, but deep enough to replace the dirt thrown out by the plow back again in the furrow, leaving the surface of the ground level and smooth as before planting.

To the rear end of the frame C the plow-handles H H are attached, and extend down on each side of the funnel E to support it, and are bolted to the heel of the plow, thus giving a firm support to all of the operating parts of the implement. The roller G, being placed centrally between in the rear of the handles H H on the shaft $g$, has its bearings in the curved brackets P P, made on the frame C. The single wheel or roller G will run in the furrow to press down the seed or fertilizer, leaving it at a uniform depth to be covered by the scrapers F F, as shown in Figs. 1 and 2.

If it is not desirable to pass a roller over the seed, the roller G can easily be removed, and two wheels substituted therefor for planting, as shown in Fig. 3.

To give a reverse motion to the rotating hopper D, cog gear-wheels or a belt may be used, or any other well-known mechanical device.

The advantages of my improved combined cotton-seed planter and guano-sower are, that any given quantity of seed or guano can be equally distributed to the acre, thereby effecting a great saving in material, time, and labor, and insuring a more uniform and better crop of cotton.

Having thus fully described my invention, what I claim, and desire to secure by Letters Patent, is—

1. A combined cotton-seed planter and guano-distributer, consisting of the plow-beam A, plow B, metal frame C, rotating hopper D, funnel E, and laterally and vertically adjustable scrapers F F, all arranged to operate in the manner substantially as herein shown and described.

2. The spring convex roller $f$, in combination with the oblong openings $e, e$ in the periphery of the rotating hopper D, for keeping the holes from clogging up, as herein specified.

In testimony whereof I hereto subscribe my name.

RICHARD D. ALLEY.

Witnesses:
H. C. MOSS,
D. P. CHRISTMAN.